May 28, 1946.  J. C. PERNERT  2,400,947
DISTILLATION
Filed June 29, 1943  2 Sheets-Sheet 2
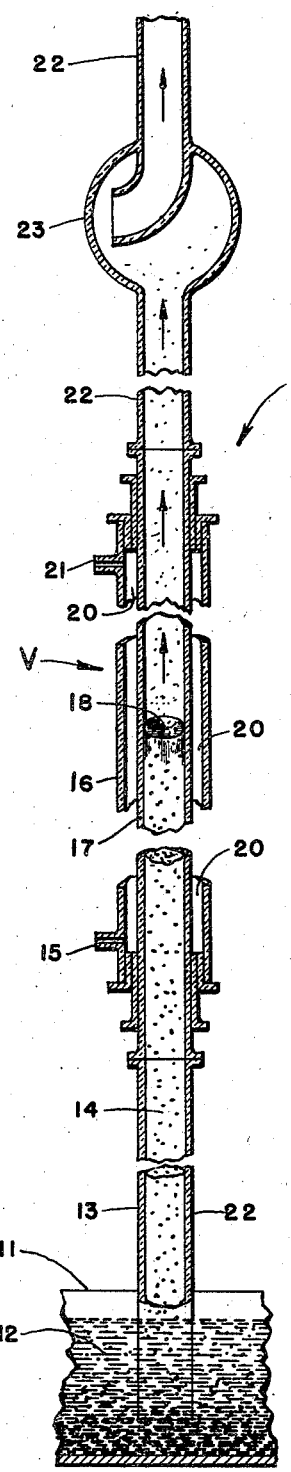
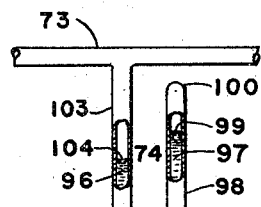
FIG. 4.
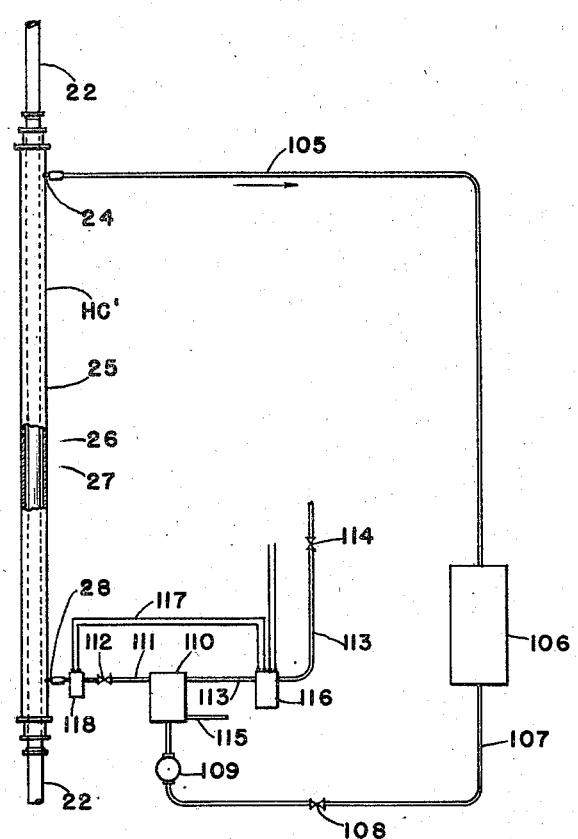
FIG. 6.
INVENTOR.
JOHN C. PERNERT,
BY
ATTORNEY Patented May 28, 1946

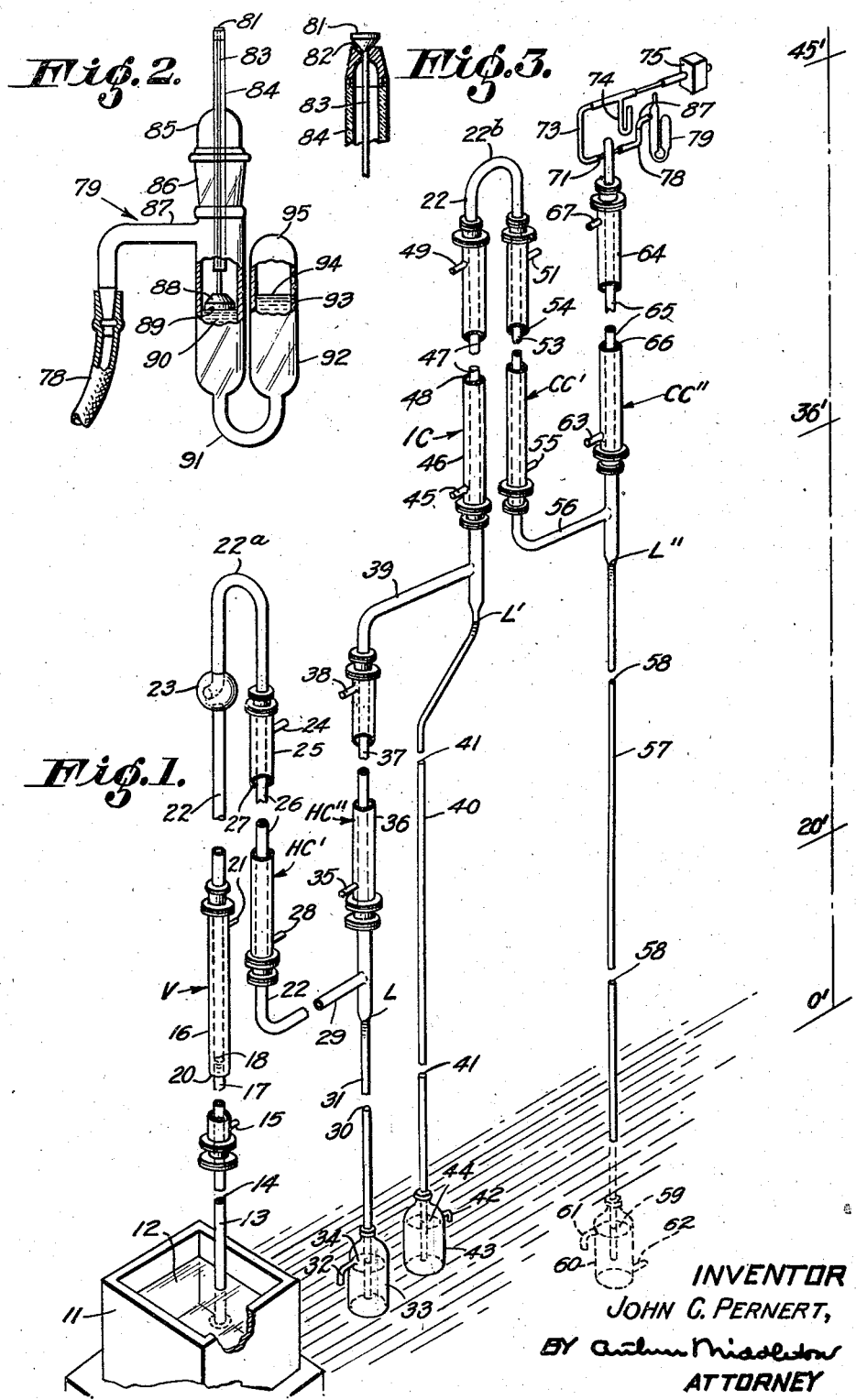

2,400,947

UNITED STATES PATENT OFFICE 2,400,947

DISTILLATION

John C. Pernert, Niagara Falls, N. Y., assignor to Oldbury Electro-Chemical Co., Niagara Falls, N. Y., a corporation of New York Application June 29, 1943, Serial No. 492,696

2 Claims. (Cl. 202—186)

This invention relates to the art of distilling and to the selective condensation and recovery of a purified vaporized volatile component of a complex or mixed liquid material to be so treated.

One object of the invention is to recover from a liquid material having a plurality of volatile components, at least one such component in purified and condensed form. Another object is to devise a combined vaporizing and condensing apparatus whose operation is continuous and substantially automatic so that it requires a minimum of attendants. Yet another object is to devise such an apparatus that is self-feeding. A further object is to devise such an apparatus wherein either or both of the feeding and discharging operations may be carried out at atmospheric pressure. A still further object is to devise such an apparatus wherein its selectivity is accurately controllable. Another object is to devise such an apparatus wherein the concentration of the yielded desired condensate is controllable. And another object is to devise such an apparatus wherein non-volatile impurities residual in the still are readily, if not automatically, removable therefrom.

The invention may be said to comprise a conduit having a boiler or vaporizer section and one or more condenser sections with means for maintaining a substantially predetermined temperature and pressure in each, coupled with pump means for effecting suction in the conduit and its sections, together with means for maintaining a body of liquid to be treated within the vaporizer, and means for collecting a body of condensate from one or more of the condensers. The invention also comprises process steps as well as combinations thereof which may be carried out in this or other apparatus.

Another feature of the invention comprises the use of a barometric leg dipping into a pool of mixed or complex liquid material at atmospheric pressure to be treated wherein the barometric leg maintains a body of such liquid extending into the vaporizer to a substantially constant level therein. Another feature comprises automatic control of the rate of feed. A further feature comprises the use of a barometric leg for collecting condensate from a condenser and dipping into a pool of yielded liquid, with the pool existing at atmospheric pressure. And a further feature comprises maintaining sub-atmospheric pressure in the conduit.

The complex or mixed liquid material for the treatment of which the apparatus of this invention is designed, comprises a liquid having at least two volatile components with differential vaporizing temperatures, and with or without non-volatile components of which one or more may be in solid phase. Illustrations of such complex or mixed liquors include impure reaction products such as butyl oxalate, tributyl phosphite, perchloric acid, and the like. A specific example of the latter is disclosed in my co-pending patent application Serial No. 487,498.

The invention is illustrated in the accompanying drawings which show a preferred embodiment thereof that is given solely to facilitate an understanding of the invention, since this showing is not to be considered as limiting, for obviously the invention may be practiced in differing apparatus, or in differing parts thereof, because this invention resides in its parts as well as in combinations thereof, as can be judged from the appended claims.

In the drawings, Figure 1 shows an isometric view of the apparatus of this invention, with some parts broken away to show interior construction, and some parts shown only diagrammatically; Fig. 2 is an enlarged view, with parts broken away, of the vacuum regulator 79 of Fig. 1; Fig. 3 shows a detail of construction thereof; Fig. 4 is a detail view of the vacuum indicator; Fig. 5 is an enlarged view, with parts broken away, of the vaporizer V, of Fig. 1; and Fig. 6 is a flowchart or diagrammatic view of the temperature-control apparatus which may be used in connection with one or both of the hot condensers HC′ and HC″.

Referring to Figure 1, the distilling system of this invention begins with a tank or basin 11 adapted to hold a pool of starting complex or mixed liquid material or liquor 12, into which dips a barometric leg 13 adapted to hold a column or body of liquid 14 maintained up to a level 18, to be treated in the boiler or vaporizer section V that is a part of the general conduit 22. The vaporizer V is comprised of an outer casing or steam jacket 16 that encircles a part or portion 17 of the conduit 22 and is provided with a steam inlet 21 and a steam outlet 15 adapted to supply steam to the steam space 20 that lies between the part 17 of the conduit 22 and the outer casing or jacket 16. Vaporization takes place within the portion 17 of the conduit 22, so it is a vaporizing zone.

That part of the general conduit 22, after rising from the vaporizer V, is provided with a trap 23 for non-volatile component and may be a Kjeldahl bulb about as shown. The conduit then reaches a high point 22ª from whence it descends to be provided with a hot condenser, indicated generally by the letters HC', and comprises an outer casing or jacket 25 that encircles a part or portion 26 of the conduit 22 to provide between it and the jacket 25 a space 27 to which hot water may be supplied through inlet 23 and removed through outlet 24. Portion 26 of conduit 22 thus comprises a hot condenser zone.

The general conduit 22 then continues through an extension 29 that joins a barometric leg 31 which dips into a pool of liquid 34 held in a jar or basin 33 having a discharge spout 32. The barometric leg 31 is adapted to hold a column or body of liquid 30 whose liquid level reaches substantially to the level marked L. The general conduit 22 then rises through another of the hot condenser unit HC'' comprising an outer casing or jacket 36 having a hot-water inlet 35 and a hot-water outlet 38, which jacket encircles a part or portion 37 of the conduit 22 to provide a water-holding space therebetween. Portion 37 of conduit thus comprises a second or further hot condenser zone. One hot condenser zone may be sufficient for distilling some liquids, although normally I prefer two in order to provide better or more efficient control. From HC'', conduit 22 rises through an extension 39 to join another barometric leg 40 dipping into a pool of liquid 44 contained in a basin 43 having a discharge spout 42. Leg 40 is adapted to hold a column or body of liquid 41 which rises to a level about at the point L'.

Conduit 22 then rises through an intermediate condenser unit IC comprising an outer casing or jacket 46 encircling a portion 47 of the conduit 22, providing therebetween a water space 48 to which water is supplied through inlet 45 and discharged through outlet 49. Portion 47 of conduit 22 is thus an intermediate condenser zone. Conduit 22 then rises to a high point 22ᵇ and descends through a cold condenser unit CC' comprising an outer casing or jacket 52 encircling a portion 53 of the conduit 22, providing therebetween a water space 54 to which water is supplied through inlet 55 and discharged through outlet 51. Portion 53 of conduit 22 is thus a cold condenser zone.

Conduit 22 then descends to join an extension 56 connected to a further barometric leg 57 adapted to hold a column or body of liquid 58 maintained to extend to a liquid level about at L''. Barometric leg 57 dips into a pool of liquid 59 held in any suitable basin or the like 60, having a spout 61 and possibly another outlet 62.

Conduit 22 next rises through another cold condenser unit CC'' comprised of an outer casing or jacket 64 encircling a portion 65 of conduit 22 to provide a water space 66 therebetween, to which is supplied cooling water through inlet 63 and discharged through outlet 67.

From this cold condenser CC'', the conduit 22 rises to a dome-like end 70, just below which are two nipple connections 71 and 72 respectively. To nipple, 71 is connected a flexible tubing 73 which has associated therewith a pressure indicator 74 (for indicating the degree of vacuum in the conduit), and a vacuum producer 75, preferably in the form of a water jet pump. To the nipple 72 is connected a flexible tubing 76 with which is associated a vacuum regulator, indicated generally at 79, but shown in detail in Fig. 2.

It is to be noted that the liquid level L of the body of liquid 30 in barometric leg 31 is maintained at a level below the extension 29 of conduit 22 so that liquid of the body is unlikely to pass, or to be passed, backward into the hot condenser HC'. Somewhat similarly, the liquid level L' of the liquid body 41 of barometric leg 40 is maintained at a level below the extension 39 of conduit 22 so that liquid of the body is unlikely to pass, or to be passed, backward and down into the hot condenser HC''. And again, the body of liquid 58 in barometric leg 57 has its liquid level L'' maintained at a level below the extension 56 of conduit 22 so that liquid of the body is unlikely to pass, or to be passed, backward into the first cold condenser CC'. Also, it is to be observed that the barometric leg 31 is arranged to collect distillate from both hot condensers HC' and HC'' and, indeed, it is such condensed distillate that forms the body of liquid 30 in that leg. Similarly, barometric leg 40 is adapted to collect condensate from intermediate condenser IC and such condensate forms the body of liquid 41 therein. Also barometric leg 57 is adapted to receive and collect condensate from the cold condensers CC' and CC''.

In the embodiment of the perchloric acid still shown, the conduit 22 and the barometric legs are made of blown glass tubing two inches in diameter, whereas the jackets of the vaporizer and condensers are of steel, with suitable sealing connections and packing glands between them and the glass tubing of the conduit. The length of the vaporizer and the condensers, as well as their relative disposition as to height, is indicated generally in Fig. 1 by the more or less accurate scale in feet shown in that figure. In order to get the proper length of the barometric leg 57 in the installation illustrated, the pool of liquid 59 in the basin or bottle 60 is located beneath the floor 80. This still rises to a height of 45 feet or so, and of course must have some supporting structure to sustain it, but no such structure has been shown in the drawings because such structure forms no part of this invention. Moreover, as it is entirely possible to embody the teachings of this specification in a still having quite different dimensions when designed to operate on other liquids, dimensional relationships of the elements of the still are not limiting except as specifically set forth herein.

A brief description of the operation of the apparatus is that the vacuum producer or suction device or pump 75 effects a suction on the entire length of the conduit 22, through vaporizer V, through hot condensers HC' and HC'', through intermediate condenser IC and through cold condensers CC' and CC'', to the vacuum pump. This suction holds the liquid body 14 sucked from the pool of liquid 12 (which is to be distilled), in barometric leg 13 up to its desired level; holds liquid body 30 in barometric leg 31 up to its desired level; holds liquid body 41 in barometric leg 40 up to its desired level—and also sucks (a) vapors from the vaporizer V into the hot condenser HC'; (b) vapors escaping from the latter into the hot condenser HC''; (c) vapors escaping therefrom into the intermediate condenser; (d) vapors escaping therefrom into first cold condenser CC'; (e) vapors escaping therefrom into the second cold condenser CC''; and finally (f) any vapors still escaping into the pump 75 to discard.

The liquid material 12 of tank 11 which is to be distilled has, from the standpoint of the distillation process, at least two predetermined or significant volatile components with differential condensing temperatures, so when these volatile components are vaporized in the vaporizer V, their vapors pass through hot condensers HC' and HC'' which are maintained heated to a temperature whereat there condenses a major portion of the vaporized primary component which has the higher condensation temperature, while in general the other or others do not. If the condensation temperatures of the two significant components are near together, naturally more of the secondary component may become inadvertently condensed here than otherwise, but its quantity can be minimized by careful control, as hereinafter explained. Distillate comprising the condensed primary component flows into and collects in the leg 31, while the yet vaporized and uncondensed portion of the primary component as well as other components are sucked into the intermediate condenser IC, which is heated to a temperature whereat the yet vaporized portion of the primary component is substantially condensed along with some contamination or dilution thereof by one or more other components that have also been condensed.

This condensate, having a minor or minimized portion of condensed primary component, flows from the intermediate condenser into and collects in the leg 40 and basin 43. Vapors escaping condensation in the intermediate condenser IC are sucked to the cold condensers which are maintained at a still lower temperature wherein the remaining components are condensed.

The result of this operation is that primary or significant distillate is recovered in concentrated condition from the hot condensers HC' and HC'' through the barometric leg 31 and the pool 34 in basin 33. This distillate has the highest concentration and the least contamination, as compared with the condensate recovered from the intermediate condenser IC through barometric leg 40 and the pool 44 in basin 43. For this reason, the condensate from the hot condensers, recovered from barometic leg 31 will be sometimes referred to as distillate while the condensed fraction from the intermediate condenser will be referred to as condensate—and so will the condensate from the cold condensers that is collected in barometric leg 57, because these condensates have so much more dilution or other contamination that they do not compare with the primary and significant end product distillate 34.

The controllable selective fractional or sequential condensation of a plurality of volatile components vaporized in one vaporizer zone, is an important feature of this invention, especially when carried out continuously. For obtaining careful and possibly critical control of the selective fractional condensation carried out, the hot condenser or condensers of this invention play an important part, namely, the pressure and temperature thereof must be accurately controlled and correlated. That is, it is desirable to have the vacuum or "suction" automatically maintained substantially constant in the entire conduit 22. This may be accomplished by the pressure regulator or manometer shown generally at 79 in Fig. 1, and in greater detail in Figs. 2 and 3, which comprises a manometer type of apparatus filled with mercury and large enough to accommodate a float which operates a valve to admit air as required when the vacuum becomes too great, and thus operates as a control mechanism in association with the vacuum pump 75.

More particularly, the flexible tubing 78 attached to nipple 72 is connected to an inlet pipe 87 leading to the main body portion 86 of the manometer, having a dome 85 supporting a tubular extension 84 rising from within the body of the manometer. This extension 84 terminates in a valve seat 82 into which fits a valve 81 from which depends a steel wire 83 extending downwardly through the tube 84 and supporting a float 88, preferably of hard rubber, which is adapted to rest on a column or leg of mercury 90 having a liquid level 89. The main or primary body 86 of the manometer is connected by a U-tube 91 with a secondary body 92 of the manometer, sealed from the atmosphere as at 95 and adapted to hold another leg or column of mercury 93 which balances the leg of mercury 90 in the primary body 86. The leg 93 has a liquid level 94.

In operation, so long as the "suction" or vacuum in the conduit system 22 is of correct degree, the mercury leg 90 stands in equilibrium with leg 93 with its level 89 as shown, on which float 88 floats, and valve 81 is seated on its valve seat 82, meanwhile conditions continue constant. But if the vacuum or suction is increased in degree by the pump 75, more than is desired, mercury leg 90 is sucked upwardly so that its liquid level 89 rises, which in turn lifts float 88, which in turn unseats valve 81 and allows air to enter the system through pipe 87, and tubing 78 into the conduit system 22, whereupon the degree of vacuum is lessened. As soon as enough air has been admitted to restore the system to its proper sub-pressure, valve 81 is seated automatically and no more air is admitted until vacuum pump 75 has again reduced the sub-pressure to the value at which the regulator will perform its cycle of operations. It is essential that the vacuum producer have ample capacity to reduce the sub-pressure of the system to the working pressure. It is the function of the regulator to cancel or make ineffective any excess capacity the vacuum producer may have. As a corollary, the regulator must be capable of admitting air faster than the excess capacity of the pump is capable of removing it. The manometer 79 is preferably made in demountable sections and as far as possible of glass.

In the tubing 73 connected with nipple 71 is a vacuum indicator indicated generally at 74 which may comprise, as shown in Fig. 4, a U-tube having one leg 103 connected with tubing 73 and another connecting leg 98 sealed at its end 100. The U-tube contains mercury having one column 96 in leg 103 with a liquid level 104, and another column of mercury 97 in leg 98 having a liquid level 99. The differential heights of these two columns of mercury indicates the amount of vacuum existing in the conduit system 22 measured in inches of mercury—namely the number of inches the liquid level 99 is above the liquid level 104.

Since the maintenance of substantially constant temperature in the hot condenser is about as important as the maintenance of constant vacuum on the conduit system 22, Fig. 6 shows a preferred embodiment of accomplishing this effect.

In Fig. 6 a typical hot condenser HC' is shown with its jacket 25 having a hot water inlet 28 (at the bottom), and a hot water outlet 24 at the top. Between this inlet and outlet is a preferred embodiment of a water heating and temperature control system shown diagrammatically and comprised as follows: Water passes from outlet 24 through piping 105 to a water storage tank 106 from which water may be withdrawn through pipe 107 that is controlled by valve 108, by a circulating pump 109, and passed to a water heater 110, from which heated water passes through pipe 111 controlled by valve 112 to hot water inlet 26 of the jacket 25 of the hot condenser HC'. To the water heater 110 is supplied steam through pipe 113 having a suitable valve control 114, adapted to supply the heat to the water in the heater 110. Exhaust steam is conducted from the heater through pipe 115. In steam pipe line 113 may be placed a temperature regulator 116 which is connected by a circuit 117 to a thermostat at about 118 in the hot water line. If the temperature of the water passing into the jacket is too low, the thermostat 118 operates the regulator 116 to feed more steam to the heater 110 and vice versa. This temperature control system for the heating water, of course, can, and in the preferred form does, operate for both hot condensers. The heating system is a closed one so that water temperatures above 100° C. can be used. Also heating media of other than steam and water may also be used.

The vaporizer V of this invention is another highly important element thereof, so it has been shown in enlarged detail in Fig. 5 wherein it shows that the barometric leg 13 dips into a pool 12 of liquid to be distilled, held in basin 11. Suction from the vacuum pump 75 causes liquid from the pool 12 to rise in the barometric leg in a body or column 14 and extend to a height so that it has a liquid level 18 maintained well within the vaporizer zone within the jacket 16 around portion 17 of the conduit 22. Heating steam is let into the jacket at 21 and out at 15 to maintain the vaporizer zone at a temperature above the vaporizing temperature of the significant volatile components of the liquid to be distilled. Vapors therefrom are sucked from the liquid level 18 as shown by the arrows, due to the suction created by the pump 75. Non-volatilized spray and solids are entrapped in the Kjeldahl bulb 23 or other suitable trap, and tend to descend therefrom and ultimately settle into the pool 12 of the basin 11, from where they can be removed to discard.

The length of the barometric leg 13 and the degree of suction, or vacuum, are correlated so that the liquid level 18 is maintained well within the vaporizing zone V, which means that this vaporizer is self-feeding. The temperature of the zone is maintained so that all of the volatile components of the liquid to be distilled, or particularly the significant two or more, are simultaneously vaporized in order to produce the complex or mixed vapors that are to be selectively condensed later in the hot condensers and the intermediate condenser. This vaporizer has a further advantage of being automatically self-cleaning in that residual deposits of solids that normally are retained within the vaporizing zone (i. e. in the conventional type of still—a distilling flask for instance), and form a "still residue" tend, in this vaporizing zone, to settle out due to the action of gravity. This vaporizing zone may be regarded as a flask or vessel without a bottom in the sense that there is a liquid path, unimpeded by a solid partition or wall extending from the vaporizing zone to the atmosphere. Therefore, non-volatiles rejected from vaporization, including particularly solids which have been formed due to the removal of volatile solvents from solutions thereof, have been observed to descend in the liquid column 14 of barometric leg 13 and collect in pool 12 in the basin 11, from which they can be removed readily, without the necessity of even interrupting the distilling process. The mixed or complex vapors pass on, due to the suction of the pump 75, to the hot condenser HC'.

It is commonly, if not usually, observed that in distillations a relatively small proportion of non-volatile residue is not removed automatically as described due to its adhesion to the heated surface where it remains as a scale or "scum." The amount of such deposit has been observed to be not much greater or less in the case of the vaporizer of this invention than in the conventional type of vaporizer. This vaporizing apparatus has an important advantage, however, (because of its tubular shape, and because it is open at the bottom), in that this deposit may be readily and conveniently removed by swabbing or other means when the vaporizer is shut down.

In the hot condenser HC' the temperature is carefully controlled, as previously described with the apparatus of Fig. 6, to be such that it is above the condensation point of all but that of the primary significant volatile component of the liquid being distilled, which is desired to be recovered in concentrated and distilled form as the end product of the distillation process. This component is condensed and becomes the distillate that is collected in the barometric leg 31 and forms a body or column of liquid 30 therein that finds its way into the pool 34 in basin 33 whence it is recovered at atmospheric pressure. In some cases, a single hot condenser HC' will be sufficient, but in cases where it is doubly important that the end product shall be highly concentrated, the second hot condenser HC'' can be used for further selectively or fractionally condensing any vapors of the primary or major significant volatile component that may somehow have escaped condensation in the first hot condenser HC'. When so condensed to become distillate, it is collected in the same barometric leg 31 as described for hot condenser HC'.

Vapors sucked from the hot condenser HC'', which have escaped being condensed therein, pass to the intermediate condenser IC wherein a temperature is maintained that is below that of the hot condenser HC'', but above that of the cold condensers. In the intermediate condenser IC, there is condensed a mixture comprising a minor proportion of substantially that portion of the primary component which may have escaped condensation in the hot condensers, plus a major proportion of some diluent or contaminant which usually is the secondary component. This condensate is collected in the barometric leg 40 as a column or body of liquid 41 that finds its way downwardly into the pool 44 of basin 43 whence it can be removed readily. This condensate liquid 44 can be used or not as the case may be. Any vapors escaping condensation in the intermediate condenser IC are sucked onwardly into the cold condenser CC and these normally comprise the volatile second significant component and possibly others of the liquid to be distilled. Such condensate may be discarded, if of no value, or it may be used if it contains valuable constituents.

Since the condensation point of vapors involves the correlation of the two factors of pressure and temperature, both must be taken into consideration in the operation of the condensing zones of this still. Ordinarily, that degree of pressure, or rather of vacuum, is chosen mainly to reduce the boiling temperature of the significant components to the desired degree and also because it must be sufficient to suck the liquid to be vaporized into the vaporizer V and also the vapors therefrom onwardly through the successive condenser zones. So some suitable vacuum is selected, whereupon the temperature whereat the components will vaporize at the selected subpressure can then be determined, and this will be the minimum temperature for the vaporizing zone; suitable temperatures for each of the condenser zones may also be selected, but these may require subsequent adjustment to attain highest efficiency and at the same time the desired concentration of the end product. Thereafter, the control apparatus for maintaining the suction, and for maintaining the temperatures in the condensers but especially the hot condenser, can next be set into operation.

The attendant then needs only to see that the operation of the still is proceeding smoothly and continuously. Samples can be taken occasionally of the liquid yielded in the pool 34 of basin 33 from the hot condenser HC' to make sure that it has the correct concentration and minimization of contamination. If these properties are incorrect, then adjustment is made either in the temperature or in the suction, as seems preferable, or possibly a slight adjustment of both. In the case of distilling perchloric acid from a reaction product starting material, it has been possible to recover concentrated distilled perchloric acid from the hot condenser such that it has less than 5 parts per million of non-volatiles in it and less than 1 part per million of iron. The concentration of such distilled acid has been attained that lies between 70 and 72%. A yield of such acid has been obtained from the first hot condenser HC' that comprises as much as 90% of the available $HClO_4$, using vacuum in the conduit 22 equal to 3/4 inch of mercury and maintaining the temperature in the hot condenser in a range of from 90° C. to 97° C. with the average standing at about 93° C. (See my copending patent application, Serial No. 487,498, for further details.) Examples of the distilling, by the use of this invention, of other complex or mixed liquors follow:

EXAMPLE I—DISTILLATION OF AN ESTER

Butyl oxalate

Impure dibutyl oxalate prepared by a conventional method, viz., boiling oxalic acid with n-butyl alcohol (commercial butanol) with provision for allowing the escape of water contained in the reactants and formed during the reaction resulted in the production of a mixture containing about 80% dibutyl oxalate and 20% unreacted butanol along with volatile and non-volatile impurities. Distillation proceeded according to this invention and was to obtain substantially purified dibutyl oxalate nearly free of volatile and non-volatile impurities.

Hot condenser temperature_____ 95° C.
Cold condenser temperature_____ 5° C.
Pressure _____ 1.0" of mercury measured by a manometer. At 1" of Hg pressure pure dibutyl oxalate boils at slightly over 140° C., while butanol boils well under 95° C. The hot condenser, therefore, condensed ester and little or no butanol. The cold condenser condensed most of the butanol and most of the ester not condensed in the hot condenser.

Distillation proceeded and a quantity of condensate was removed from each condenser. These were examined; their physical properties are shown in the table below:

|  | Sp. g. at 21° C. | Refractive index |
|---|---|---|
| Butanol | 0.81 | 1.3982 |
| Complex mixture fed to still | 0.95 | 1.4185 |
| Condensate—hot condenser | 0.99 | 1.4230 |
| Condensate—cold condenser | 0.86 | 1.4060 |

The two condensates were clear and colorless while the undistilled residue was colored and somewhat turbid. This indicates that the distillate was substantially purified with respect to non-volatile material. The condensate from the hot condenser had no odor of butanol, and its physical properties were approximately the same as those of dibutyl oxalate known to be pure. This indicates substantial purity of this condensate. The cold condenser condensate was a mixture containing about 1/3 dibutyl oxalate and about 2/3 n-butyl alcohol, also possibly some volatile impurities.

EXAMPLE II—DISTILLATION OF AN ESTER

Tributyl phosphite

Commercial butanol was reacted with phosphorus trichloride producing a reaction product containing tributyl phosphite. The reaction mixture contained about 20% unreacted n-butyl alcohol, a large percentage of tributyl phosphite and, as an impurity, butyl acid phosphite along with other reaction products and impurities. Partial removal of acidic impurities was accomplished by adding an excess of anhydrous ammonia and filtering. The material requiring distillation contained around 80% tributyl phosphite, the desired product, and around 20% butyl alcohol along with impurities such as butyl chloride, ammonia, etc. (volatile) and ammonium salts (relatively non-volatile).

The mixture was distilled as described in Example I.

Hot condenser temp_____ 95°
Cold condenser temp_____ 5°
Pressure _____ 1.4" (35 mm.) Hg.

Results:

|  | Sp. g. at 22 | Refractive index |
|---|---|---|
| Butanol | 0.81 | 1.3982 |
| Complex mixture fed to still | 0.92 | 1.4210 |
| Condensate hot condenser | 0.94 | 1.4280 |
| Condensate cold condenser | 0.83 | 1.4035 |

Both condensates, clear and colorless. Undistilled residue, colored and somewhat turbid. The hot condenser condensate had a very faint odor, but was substantially purified tributyl phosphite. It was slightly acidic, and this indicates that it may have contained a small amount of an acidic ester as an impurity, possibly dibutyl phosphite. The cold condenser condensate contained about 75 to 80% n-butyl alcohol, the remainder largely tributyl phosphite along with some volatile impurities.

EXAMPLE III—RECLAIMING A SOLVENT

Butyl Cellosolve

Commercial monobutyl ether or ethylene glycol, butyl Cellosolve, $C_4H_9OC_2H_4OH$, was found valuable as a solvent for purification of certain salts of monoaryl phosphoric acids. Specifically, disodium monophenyl phosphate was purified by adding butyl Cellosolve to an aqueous solution of the salt. The solvent, for re-use, was required in a substantially water-free condition, viz: less than 5% water The solution requiring purification had the approximate composition (as regards volatile components) 80% butyl Cellosolve—20% water. It was saturated with salts at a temperature of about —5° C. A quantity was vacuum distilled in the apparatus and by the procedure described in Example I.

| | |
|---|---|
| Vacuum | 5" of Hg. |
| Hot condenser temp | 85° C. |
| Cold condenser temp | 5° C. |

After a period of distillation during which solution was fed into the vaporizing zone continuously while heat was applied so that the mixture boiled vigorously and distilled, the condensates from the hot and cold condensers were examined:

| | Percent |
|---|---|
| Condensate from hot condenser butyl Cellosolve | 97 |
| Water | 3 |
| Condensate from cold condenser butyl Cellosolve | 40 |
| Water | 60 |

The condensate from the hot condenser was suitable for re-use in purification of further quantities of salt.

Example IV—Perchloric Acid

Impure perchloric acid was made by reacting an excess of concentrated hydrochloric acid with a warm, saturated solution of sodium perchlorate. The mixture was cooled and the solid phase (principally NaCl) was removed by filtration. Most of the HCl and a part of the water was removed by evaporating the solution until it contained about 57% $HClO_4$. The solution was allowed to cool whereupon solids crystallized and settled out. The clear, supernatant liquor decanted from the solids was used in the subsequent distillation. It had the following composition:

| | | |
|---|---|---|
| $HClO_4$—956 g. p. l | per cent | 60 |
| HCl—0.5 g. p. l | do | 0.03 |
| Non-volatile 26 g. p. l | do | 1.6 |
| Water (by difference) | do | 38.37 |
| Sp. g | | 1.60 |

This mixture was distilled as described in Example I:

| | |
|---|---|
| Hot condenser temperature | 99° C. |
| Cold condenser temperature | 5° C. |
| Pressure | 1.0" (25 mm.) Hg |

In this case the jacket of the hot condenser was vented so that the water was at atmospheric pressure. The water had a tendency to boil, so that its temperature was automatically maintained at 99 to 100° C.

Results:

| | Sp. g. at 25° C. |
|---|---|
| Water | 1.0 |
| Complex mixture fed to still | 1.60 |
| Condensate from hot condenser | 1.668 |
| Condensate from cold condenser | 1.07 |

The condensate from the hot condenser was practically colorless and contained 70.3% of perchloric acid. The non-volatile impurities were less than 50 parts per million; HCl was about 1 P. P. M.

The condensate from the cold condenser contained about 88% $H_2O$, 11% $HClO_4$, a small amount of HCl, and was pale yellow in color.

The residual, undistilled material was colorless, and contained a large proportion of solids (nearly all crystalline $NaClO_4$) which settled readily when boiling had ceased.

I claim:

1. Distilling apparatus comprising a conduit having a vaporizer section and a condenser section, a barometric leg for each of said sections with the leg of the vaporizer section being substantially uniform in diameter therewith, a supply of mixed feed liquor in a pool into which dips the leg of the vaporizer and which has at least two significant components with differential condensing temperatures, fluid jacket means external of the vaporizer for controlling the temperature of the contents of the vaporizer to be at least at the vaporizing temperature of both said components, means external of the condenser for controlling the temperature of the contents thereof to be below the condensing temperature of one but above that of the other vaporized components, a basin for collecting condensate from the condenser passing thereto through the leg of the condenser, and automatically controlled suction means for maintaining sub-atmospheric pressure in the conduit to a degree to suck feed liquor from the pool upwardly into the vaporizer through its leg and to maintain liquor so sucked into the vaporizer at a level therein between the bottom and top thereof, said vaporizer being at an elevation directly above the leg with the leg forming a downward continuation thereof sufficiently vertical for gravitational settling of suspended solids from the vaporizer to the leg with the leg thus simultaneously forming not only a path for the upflow of feed liquor to the vaporizer from the pool but a path for the downward passage from the vaporizer through its leg to the pool of suspended solid components substantially as rapidly as formed in the liquor being vaporized.

2. Apparatus according to claim 1 with the addition of a further condenser for the conduit to which said suction means pass vapors escaping condensation in the first condenser, means for condensing vapors therein, and means for maintaining in association with each said condenser means a single body of liquid derived from vapors condensed therein.

JOHN C. PERNERT.